United States Patent
Watanabe

(10) Patent No.: US 6,382,009 B2
(45) Date of Patent: May 7, 2002

(54) METHOD OF ADJUSTING HEIGHT OF MAGNETIC HEAD

(75) Inventor: Masaharu Watanabe, Yamagata (JP)

(73) Assignee: Mitsumi Electric Co., Inc., Tokyo (JP)

( * ) Notice: Subject to any disclaimer, the term of this patent is extended or adjusted under 35 U.S.C. 154(b) by 0 days.

(21) Appl. No.: 09/745,731

(22) Filed: Dec. 26, 2000

(30) Foreign Application Priority Data

Jan. 6, 2000 (JP) .......................... 12-005787

(51) Int. Cl.$^7$ .................. B21D 53/00; G11B 5/187
(52) U.S. Cl. .............. 72/326; 29/603.07; 29/603.01
(58) Field of Search ............. 72/326, 325; 29/603.07, 29/603.02, 603.01; 360/120, 110

(56) References Cited

U.S. PATENT DOCUMENTS 4,962,584 A * 10/1990 Matsuda ................ 29/603
5,320,013 A * 6/1994 Nonami ................... 83/25

FOREIGN PATENT DOCUMENTS

| DE | 850954 | * | 9/1952 | ........... 72/326 |
| GB | 674514 | * | 6/1952 | ........... 72/325 |
| JP | 8-55319 | | 2/1996 | |

* cited by examiner

Primary Examiner—Daniel C. Crane
(74) Attorney, Agent, or Firm—Whitham, Curtis & Christofferson, P.C.

(57) ABSTRACT

A magnetic head 1 provided with head chips 3 at distal end portions 2a of base plates 2. A punch 12 is abutted against each of the base plates 2 which is placed on a die 11, and a shearing force is applied to the base plate to plastically deform the distal end portion 2a, whereby adjustment of the height can be conducted while the sliding face of the head chip is kept in parallel to a reference track plane.

4 Claims, 5 Drawing Sheets

METHOD OF ADJUSTING HEIGHT OF MAGNETIC HEAD

BACKGROUND OF THE INVENTION

The present invention relates to a method for adjusting height of a magnetic head, such as a double azimuth type magnetic head which is assembled in a video tape recorder, for example.

The video tape recorder is provided with a cylinder head 52, around an outer peripheral face of which a video tape 50 supported by means of guide pins 51, 51 slidably runs, as shown in FIG. 4. The video tape 50 slidably runs in a state where it is wound around the cylinder head 52 at a determined inclination angle and along a determined angular range with respect to the cylinder head 52. A pair of double azimuth type magnetic heads (hereinafter referred to simply as "magnetic head") 53 are mounted at an equal interval on the cylinder head 52 with their one portions exposed from the outer peripheral face of the cylinder head. Each of the magnetic heads 53 includes a printed board 54, a pair of base plates 55 which are assembled to one side of the printed board 54 in a cantilever manner, and head chips 56 which are respectively attached to distal end portions of these base plates 55, as shown in FIGS. 5 and 6.

The magnetic head 53 is assembled to the cylinder head 52 in such a manner that a sliding face 56a of the head chip 56 in which a magnetic gap G is formed (see FIG. 7D) is exposed outward from the outer peripheral face of the cylinder head 52. The magnetic head 53 precisely records and reproduces, in a rotating state of the cylinder head 52, recorded image information, audio information, and so on by helically scanning the video tape 50 which is slidably running around the outer peripheral face of the cylinder head at high speed. For this reason, it is necessary for the magnetic head 53 to locate the magnetic gap G of the head chip 56 precisely in a scope of some micron with respect to a recording track of the video tape 50, as shown in FIG. 6.

By the way, the magnetic head 53 varies in height because of variation in thickness of the head chips 56 due to slicing accuracy when the head chip 56 is manufactured, or pasting accuracy when this head chip 56 is pasted to the base plate 55, and an adjusting operation of the height is required. In a related method for adjusting the height as disclosed in Japanese Patent Publication No. 8-55319A, for example, the height of the head chip 56 has been adjusted by varying flatness of the base plate 55 with respect to a reference plane.

After the above described adjusting operation has been conducted, a sliding face 56a of the head chip 56 in the magnetic head 53 is polished in order to give a favorable touch with the video tape 50. This polishing process is conducted by mounting the magnetic head 53 on a polishing jig in a cylindrical shape like the cylinder head 52 and by driving a wrapping tape to run. The wrapping tape slidably runs at a determined inclination angle and a winding angle in a determined range, in the same manner as the video tape 50, thereby polishing the sliding face 56a of the head chip 56 so as to give a desired curvature.

The height of the magnetic head 53 has been adjusted by bending and deforming the base plate 55 at a desired angle by means of a press member 62 and a push-up member 63 in a state where a base part of the base plate 55 is held between a holding table 60 and a press board 61, as specifically shown in FIG. 7A. The base plate 55 of the magnetic head 53 is bent and deformed by pushing up the push-up member 63 from below in a state where a projected portion of the base plate 55 is pressed from above by the press member 62.

However, in such a related method for adjusting the height, the distal end portion of the base plate 55 is bent and deformed in an arcuate shape around a pressing position of the press member 62, as shown in FIG. 7B. As a result, the sliding face 56a of the head chip 56 will not be retained in parallel to the reference track plane. Accordingly, when the above described polishing process is applied to the sliding face 56a of the head chip 56, an apex of a curvature r in a direction of thickness in an area near the track is displaced by an amount of Δx with respect to a center of the gap G, as shown in FIG. 7C.

For this reason, a center P of magnetic interference fringes generated on the sliding face 56a of the head chip 56 is deviated from the center O of the magnetic gap G, as shown in FIG. 7D. Such magnetic head 53 is inferior in recording and reproducing property for the image information and the audio information, because tape touch will be worsened when the magnetic head has been assembled to the cylinder head 52, even though the above described height adjustment has been conducted.

SUMMARY OF THE INVENTION

In view of the above, an object of the invention is to provide a method for adjusting height of a magnetic head in which recording and reproducing property with higher accuracy can be obtained by simply conducting the height adjustment, while maintaining the sliding face of the head chip in parallel to a reference track plane.

In order to achieve the above object, according to the present invention, there is provided a method of adjusting a height of a head chip, which is attached to one end portion of a base plate to constitute a magnetic head, with respect to a reference plane of the base plate, comprising the steps of:

placing a face of the base plate which is to be the reference plane onto a first plane face of a die member; and punching a punch member onto a predetermined portion of the base plate toward a diagonal direction with respect to the reference plane such that a portion of the base member on which the head chip is attached is shearing-deformed by a predetermined amount in the punching direction.

Preferably, the predetermined amount is set within a plastic deformable range of the base plate.

Preferably, the die member is provided with a second plane face extending orthogonally to the first plane face. The second plane face, the predetermined portion of the base plate and a shearing blade face of the punch member are arranged on an identical line.

Preferably, the deforming direction of the base plate is parallel with a sliding face of the head chip, which is to be slid on a recording medium.

In the above configurations, a shearing deformation process is conducted on the sliding face of the head chip while keeping a diagonal attitude thereof with respect to the reference plane. Accordingly, adjustment of the height is conducted in a state where the sliding face of the head chip and a reference track plane of the recording medium are kept in parallel to each other. Therefore, when the polishing process is applied to the sliding face of the head chip, the center of the curvature of the sliding face and the center of the magnetic gap are substantially aligned, to give a favorable tape touch, whereby a magnetic head which can carry out recording and reproduction with high accuracy can be manufactured. Further, the height adjustment with high precision can be simply performed, and necessity of assembling the magnetic head to a cylinder head employing various spacers will be eliminated. Remarkable improvement of working efficiency will be thus attained.

DETAILED DESCRIPTION OF THE PREFERRED EMBODIMENTS

Figure 1A:
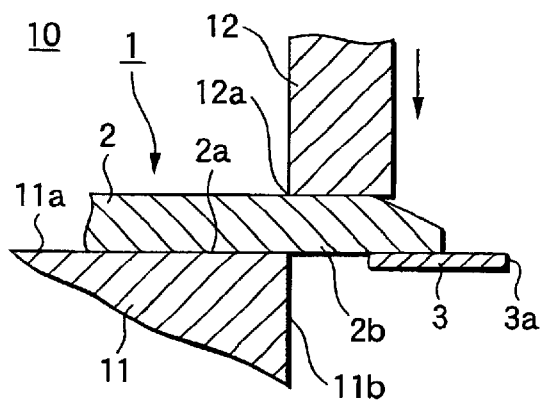
FIGS. 1A to 1E are views for explaining a method of adjusting height of a magnetic head according to one embodiment of the invention.

One embodiment according to the invention will be described in detail referring to the accompanying drawings. As a magnetic head 1 applied to this embodiment, the double azimuth type magnetic head is also shown, and it has a same structure as the above described magnetic head 53 in that it comprises a printed board which is not shown, a pair of base plates 2 assembled to one side of the printed board in a cantilever manner, and head chips 3 respectively pasted to distal end portions of these base plates 2. A pair of the magnetic heads 1 are assembled to a cylinder head which is not shown, with sliding faces 3a of the respective head chips 3 exposed outward from an outer peripheral face of the cylinder head.

In the magnetic head 1, the head chips 3 which have been sliced to a determined thickness through a chip manufacturing process are attached to the distal end portions of the base plates 2 by means of an appropriate adhesive in such a manner that their sliding faces 3a are projected outward. Variation in height of the head chips 3 attributed to the slicing accuracy or the pasting accuracy with respect to the base plates 2, in other words, with respect to a reference track level L in the magnetic head 1 will be also adjusted through an adjusting treatment, which will be described below in detail. Further, after the height adjusting process has been performed, the polishing treatment will be applied to the sliding faces 3a of the head chips 3. After all these processes have been conducted, the magnetic head 1 is assembled to the cylinder head.

The height adjusting treatment for the magnetic head 1 is conducted by applying the shearing deformation work to the base plate 2 by means of a press 10 as shown in FIG. 1. The press 10 is composed of a die 11, and a punch 12 which is actuated to move up and down with respect to the die 11 by means of a hydraulic or pneumatic driving mechanism. The die 11 is placed on a base which is not shown, with its upper face 11a as a reference plane while its end face facing with the punch 12 as a shearing face 11b. A portion of the punch 12 facing with the shearing face 11b is constructed as a shearing edge 12a as well known, which shears a workpiece when the punch 12 has descended onto the die 11 as shown by an arrow in FIG. 1A.

Figure 1B:
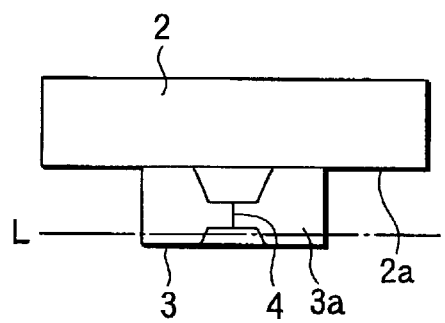

The magnetic head 1 is placed on the upper face 11a of the die 11 as shown in FIG. 1A, with a bottom face 2a of the base plate 2 as the reference plane and with the distal end portion 2b to which the head chip 3 has been pasted projected outward from the shearing face 11b. In this state of the magnetic head 1, a center of a magnetic gap 4 formed on the sliding face 3a of the head chip 3 is located at a position slight higher than the reference track level L, as shown in FIG. 1B. The press 10 holds the base plate 2 of the magnetic head 1 by pressing it onto the upper face 11a of the die 11 by means of a pressure plate which is not shown.

Figure 1C:
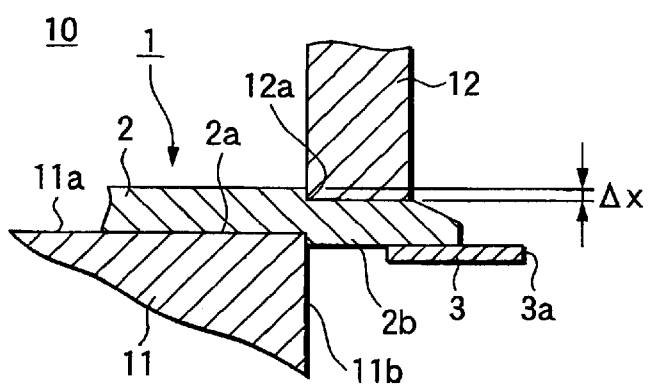

Under this condition, the driving mechanism is actuated to abut the punch 12 against the base plate 2 of the magnetic head 1 from the above. The punch 12 is lowered from the position where it is abutted against the upper face of the base plate 2 to a determined amount Δx of height as shown in FIG. 1C, and then, elevated again. In this manner, the punch 2 applies the shearing force to the base plate 2.

Figure 1D:
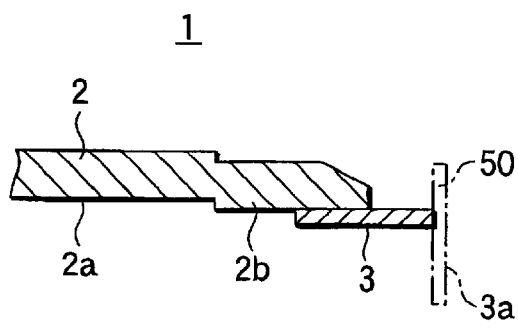

Because the base plate 2 is in a plastically deforming zone in this state, it will not be sheared, but the distal end portion 2b projecting from the shearing face 11b of the die 11 is plastically deformed keeping its parallel alignment to the bottom face 2a constituting the reference plane. In other words, the base plate 2 is bent at the distal end portion 2b in a substantially crank shape as shown in FIG. 1D with respect to the base portion.

Figure 1E:
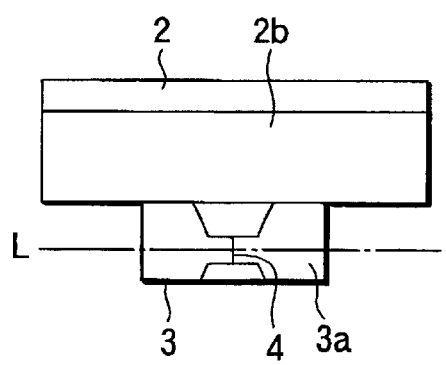

Therefore, the head chip 3 pasted to the distal end portion of the base plate 2 is displaced downward while the sliding face 3a is maintained in such a state that it intersects the video tape 50 at the right angle, whereby the adjustment of the height is performed. In other words, in the magnetic head 1 as shown in FIG. 1E, the sliding face 3a of the head chip 3 is retained in parallel to the reference track level L, and at the same time, the center of the magnetic gap 4 is positioned in correspondence to the height of the reference track level L.

Figure 2:
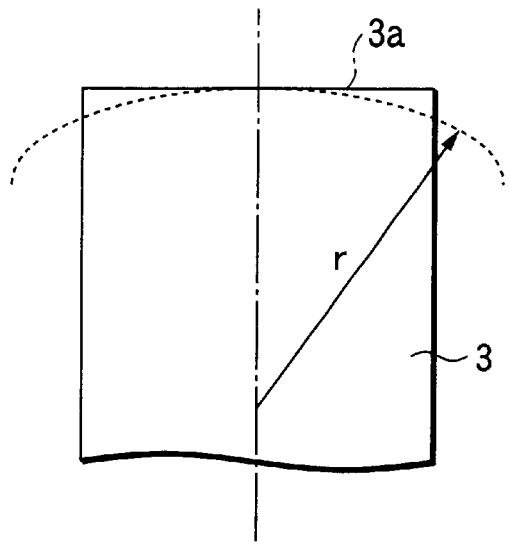
FIG. 2 is an explanatory view of a sliding face of the head chip obtained by the adjusting method of the invention.

After the above described height adjustment of the magnetic head 1 has been conducted, the polishing treatment is applied to the sliding face 3a of the head chip 3 so as to make the touch with the video tape 50 favorable. The magnetic head 1 is mounted on a polishing jig, and a wrapping tape is driven to run, whereby the sliding face 3a of the head chip 3 is polished to have an arcuate face having a determined curvature r with respect to a direction of its thickness, as shown in FIG. 2.

Figure 3:
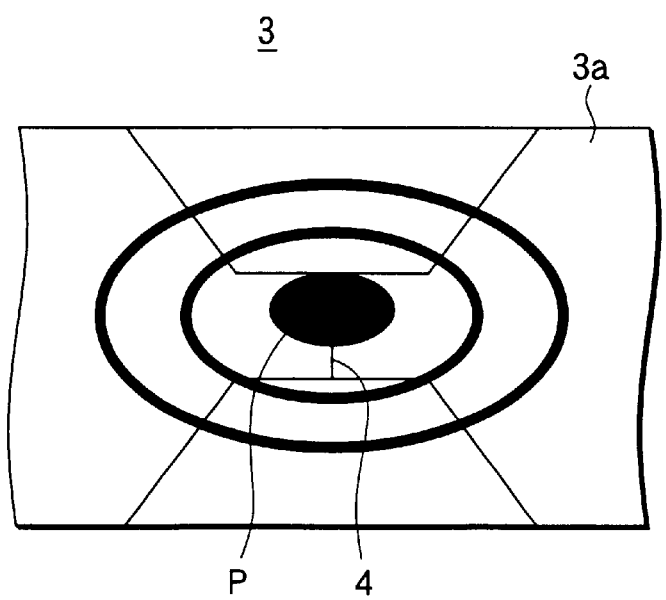
FIG. 3 is an explanatory view of position relationship between the sliding face and magnetic interference fringes.
Figure 4:
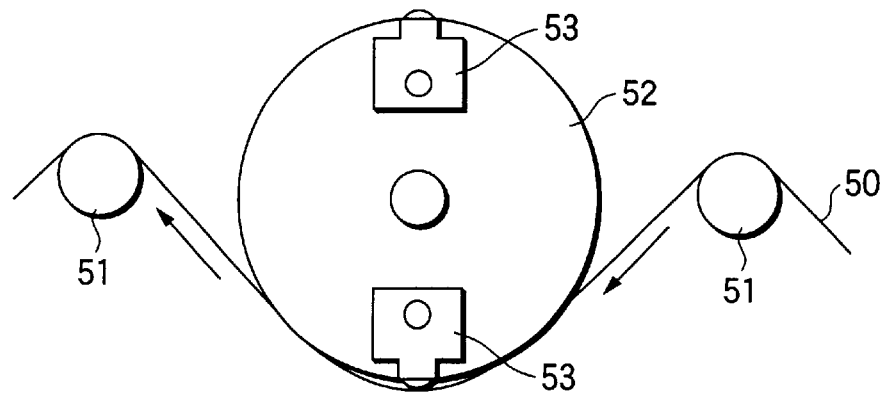
FIG. 4 is a plan view of an essential part for explaining a structure of a head part of a video tape recorder.
Figure 5:
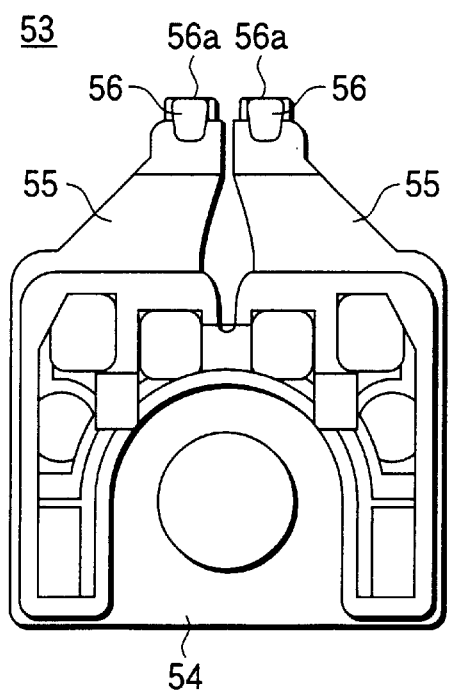
FIG. 5 is a plan view of a double azimuth type magnetic head adapted to be mounted on the head part of FIG. 4.
Figure 6:
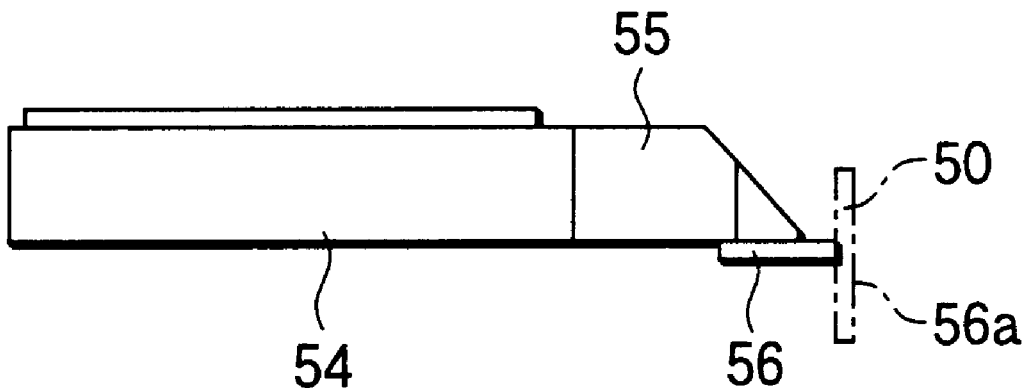
FIG. 6 is a side view of the double azimuth type magnetic head.
Figure 7A:
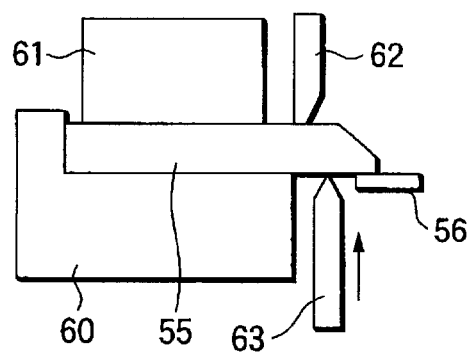
FIGS. 7A to 7D are views for explaining a related method of adjusting the height of the magnetic head.
Figure 7B:
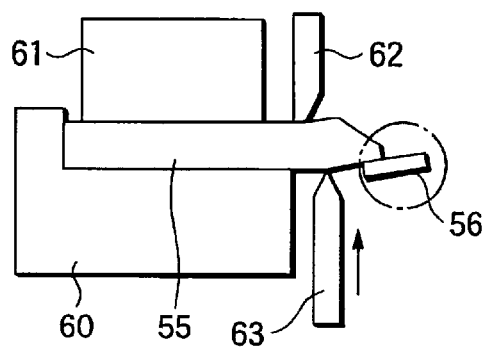
Figure 7C:
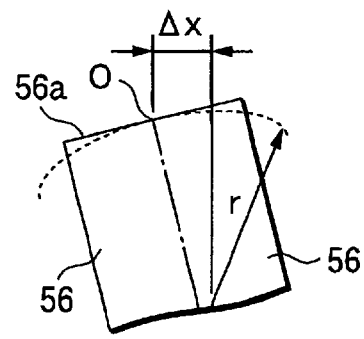
Figure 7D:
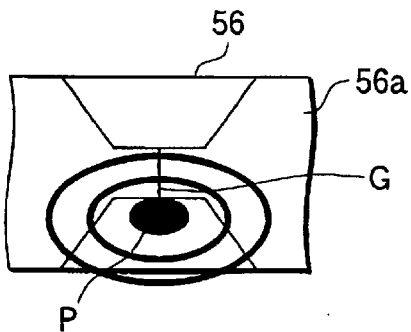

Since the sliding face 3a of the head chip 3 is retained in parallel to the reference track level L as described above, the sliding face 3a is polished under condition that an apex of the curvature r in a direction of the thickness near the track has substantially come in alignment with the center of the magnetic gap 4. In the magnetic head 1, the center P of the magnetic interference fringes generated on the sliding face 3a of the head chip 3 comes substantially in alignment with the center of the magnetic gap 4 as shown in FIG. 3. Therefore, the tape touch of the magnetic head 1 will be favorably maintained in the assembled state to the cylinder head, even though the above described height adjustment has been conducted, and the recording and reproducing property of the image information and the audio information will not deteriorate.

Since the head chip 3 will not be inclined with respect to the reference track level L, and the height can be accurately adjusted, necessity of a plurality of spacers which have been required in assembling the magnetic head 1 to the cylinder head will be eliminated. Accordingly, assembling steps of the magnetic head 1 to the cylinder head will be simplified, and so, productivity and yield can be enhanced.

Although the double azimuth type magnetic head has been described as an application example in the above described embodiment, the invention is not limited to such the magnetic head 1, but it is apparent that the invention can be widely applied to other types of magnetic heads. Further, the magnetic head 1 in which the base plate 2 is plastically deformed downward to conduct the height adjustment has been described in this embodiment. However, by actuating the punch 12 on the base plate 2 which is placed on the die 11 upside down, an upward height adjustment can be conducted.

What is claimed is:

1. A method of adjusting a height of a head chip, which is attached to one end portion of a base plate to constitute a magnetic head, with respect to a reference plane of the base plate, comprising the steps of:

placing a face of the base plate which is to be the reference plane onto a first plane face of a die member; and punching a punch member onto a predetermined portion of the base plate toward a diagonal direction with respect to the reference plane such that a portion of the base member on which the head chip is attached is shearing-deformed by a predetermined amount in the punching direction.

2. The adjusting method as set forth in claim 1, wherein the predetermined amount is set within a plastic deformable range of the base plate.

3. The adjusting method as set forth in claim 1, wherein the die member is provided with a second plane face extending orthogonally to the first plane face; and wherein the second plane face, the predetermined portion of the base plate and a shearing blade face of the punch member are arranged on an identical line.

4. The adjusting method as set forth in claim 1, wherein the deforming direction of the base plate is parallel with a sliding face of the head chip, which is to be slid on a recording medium.

* * * * *